United States Patent [19]

Hodsdon

[11] Patent Number: 5,159,706

[45] Date of Patent: Oct. 27, 1992

[54] SELECTIVE STOP DEVICE FOR A MULTI CHANNEL FREQUENCY SWITCH

[75] Inventor: Roy F. Hodsdon, Lynchburg, Va.

[73] Assignee: Ericsson - GE Mobile Communications Inc., Lynchburg, Va.

[21] Appl. No.: 759,693

[22] Filed: Sep. 9, 1991

Related U.S. Application Data

[63] Continuation of Ser. No. 390,253, Aug. 7, 1989, abandoned.

[51] Int. Cl.$^5$ .............................................. H04B 1/38
[52] U.S. Cl. ...................................... 455/90; 455/347; 455/351; 200/11 R
[58] Field of Search ................. 455/90, 347, 348, 351, 455/354, 170.1, 171.1; 200/11 E, 11 G, 336, 564; 74/527

[56] References Cited

U.S. PATENT DOCUMENTS

| | | | |
|---|---|---|---|
| 3,345,568 | 10/1967 | Errichiello et al. | 455/347 |
| 3,903,383 | 9/1975 | Marker | 200/11 T W |
| 4,527,023 | 7/1985 | Ohashi et al. | 200/11 G |

Primary Examiner—Reinhard J. Eisenzopf
Assistant Examiner—Edward Urban
Attorney, Agent, or Firm—Nixon & Vanderhye

[57] ABSTRACT

A radio transceiver unit is provided which comprises a housing, a radio unit mounted within the housing; a frequency switch mounted within the housing and including a shaft extending above a top plate of the housing, the frequency switch permitting the unit to operate at any of a predetermined number of frequencies. A frequency selector knob is rotatably mounted on the shaft for indexing the frequency switch to any one of the predetermined frequencies, and a stop device is provided for limiting rotation of the knob to any consecutive series of the frequencies from 1 up to and including a maximum available number less one.

22 Claims, 3 Drawing Sheets

SELECTIVE STOP DEVICE FOR A MULTI CHANNEL FREQUENCY SWITCH

This is a continuation of application Ser. No. 07/390,253, filed Aug. 7, 1989, now abandoned.

BACKGROUND AND SUMMARY OF THE INVENTION

This invention relates generally to radio transceiver units, and in particular, to a selective stop device for a multi-channel frequency switch.

For marketing and other reasons, manufacturers of radio communications devices typically offer several different configurations for each communications product manufactured. A particular model of mobile radio transceiver may have a "basic" or minimal configuration but may optionally be provided with additional features or "options" at additional cost.

For example, a basic transceiver configuration may provide communications over a limited number of communications channels for basic radio transmitting and receiving functions required by all users. Some users may, however, have additional requirements requiring additional features—such as additional communications channels, receiver channel scanning, etc. The ability of a manufacturer to provide such additional "options" permits increases in the flexibility, versatility, desirability and range of applications of the product without penalizing purchasers of the basic configuration with increased cost. Purchasers of the basic model pay a minimum price for the minimal configuration, while users requiring additional "option" features pay an increased price based on the number and type of options required.

In the past, additional options were generally provided by incorporating additional components and circuitry into the device. For example, in the past, channel scanning capability or additional operating channels were added by installing additional frequency selection circuitry into the transceiver. Similarly, the tone activated squelch option typically required an additional tone decoder circuit to be installed. Transceiver designers used modular architectures to accommodate additional plug-in "option modules".

An example of this design approach is the prior art "MLS" series radio transceivers manufactured for General Electric Company by Japan Radio Corp. These "MLS" transceivers include basic transceiver circuitry disposed within a housing. The front panel assembly of the transceiver housing was manufactured separately, and consists of a separable front panel "escutcheon" plate. Mechanically mounted to the escutcheon plate is a printed circuit board which plug-connects to the basic transceiver circuitry when the escutcheon plate is mechanically fastened to the housing. The escutcheon plate and associated printed circuit board comprises a module separable from the transceiver main housing and basic circuitry. The module includes user controls mounted on the escutcheon plate and circuitry required to connect user controls mounted on the plate to the transceiver circuitry.

Since different "option" features in many cases require different additional user controls, different models of escutcheon plate modules were produced for the "MLS" series transceivers. In particular, the "MLS" transceiver was made available in five different versions: (1) a two-channel "basic" version; (2) an 8-channel version with the scan feature; (3) a 16-channel version without scan; and (4) a 16-channel version with scan feature. Five different interchangeable escutcheon plates with different user control arrangements corresponding to these five different transceiver versions were also made. The particular escutcheon plate/control panel installed on a particular "MLS" transceiver limited the transceiver features the user could access. For example, the escutcheon plate corresponding to the "MLS" transceiver versions with 16-channel capability and no scan feature does not have a control to actuate the scan feature—preventing the user from obtaining the of the scan feature. Similarly, the escutcheon plates corresponding to the 8-channel transceiver versions do not include user controls to access more than 8 channels.

Since all "MLS" transceivers included identical basic transceiver circuitry and main housing, reduced manufacturing costs and increased reliability derived from large scale manufacturing were obtained. Specific purchaser selected options could be provided in a particular unit simply by installing the appropriate escutcheon plate module —a procedure which could be performed in the field if desired. Incorporation of the circuitry performing the option functions and user controls interacting with such circuitry within the same front panel escutcheon plate module permitted a transceiver to be reconfigured by simply "unplugging" one module and "plugging in" a different module (further increasing reliability and decreasing manufacturing costs).

In this regard, see commonly assigned U.S. Pat. No. 4,941,174.

In order to adapt a unit to a customer's frequency requirements, it has been the practice to modify the internal construction of the frequency selection switch by the addition of a pair of stop elements. This procedure undesirably delayed the final assembly of the unit until the customer's requirements were known.

It is a principal object of this invention to provide a selective stop device which permits a multi frequency selector switch to be easily adapted to permit any consecutive series of frequencies to be set from one through any number from one to fifteen, in a transceiver unit which otherwise has a sixteen channel capability, and which has otherwise been substantially completely assembled. In other words, the rotational movement of the switch can be limited to index only channel one; channels one and two; channels one through three, etc., up through a series including channels one through fifteen. In the event full sixteen channel capability is desired, the limit mechanism is simply removed, and the switch is utilized in its normal fashion.

In an exemplary embodiment of the invention, a generally cylindrical frequency selector knob is mounted by means of a set screw to an output shaft of a multi frequency selector switch mounted within the transceiver unit housing. To facilitate assembly and disassembly of the knob, a set screw is provided which extends radially through a bore provided in the knob for engagement with a flat surface provided on the switch shaft.

A top plate of the transceiver unit housing, through which the multi channel frequency selector switch shaft protrudes, is marked with indicia corresponding to, for example, frequencies 1–16 in a circular array about the selector knob. During assembly, the frequency selector switch shaft is rotated in a counterclockwise direction until stopped by an internal limit provided within the switch. This position corresponds to channel one. With the shaft in this position, the knob is mounted on the shaft and tightened by the set screw in an orientation such that a channel indicator on the knob points to the channel one indicia on the top plate of the housing. In this configuration, the frequency selector knob is indexable in stepwise fashion through channels one through sixteen.

As discussed hereinabove, however, the otherwise standardized construction of the unit may be configured to a different version, for example, a unit with four or eight channel capability, even though the unit is capable of a full sixteen channel range. In order to facilitate quick and simple conversion of the otherwise standardized and subsequently completely assembled unit to these different versions, a stop plate or disc is provided between the top plate of the unit housing and the lower surface of the selector knob in order to limit the rotation of the knob in a predetermined manner. Advantageously, no modification to the internal construction of the selector switch is required.

Specifically, the stop plate or disc is formed with a plurality of inwardly directed teeth on its lower surface which are adapted to mesh with a plurality of corresponding teeth formed within a recess in the top plate of the unit housing. At the same time, the upper surface of the disc or stop plate is formed with a circular recess defined by inner and outer peripheral walls, the continuity of the recess being interrupted by a radially oriented stop bar. The disc or plate is also provided with a centralized bore for slidably mounting the disc on the switch shaft as described below.

When it is determined that the transceiver unit is to have less than a sixteen channel capability, the frequency selector knob is removed and the stop plate or disc is slidably mounted on the switch shaft with the stop bar arranged to point to that channel which exceeds the desired maximum channel range by one. The meshing teeth on the underside of the disc and within the recess of the top plate thereafter prevent any rotational movement of the disc. By way of example, if a channel sequence of one through eight is desired, the disc is arranged so that the stop bar points to numeral nine on the top plate. The knob is then replaced on the shaft and tightened with the set screw such that the frequency indicator provided on the knob points to channel one. Now, the knob is rotatable in stepwise fashion consecutively from channel one through channel eight, it being understood that since the stop bar occupies a channel position, i.e., channel nine, rotation beyond the channel eight position is effectively prevented.

In a similar manner, any consecutive series of channels may be selected by the appropriate adjustment of the stop plate or disc.

It will therefore be appreciated that in one exemplary embodiment, the present invention is directed to a radio transceiver unit which includes a housing; a frequency switch mounted within the housing; and a rotatable knob for indexing the switch to a plurality of predetermined frequencies from one to n (where n=16 in a preferred embodiment), the knob having a frequency indicator thereon, and the housing having frequency indicating indicia thereon; the improvement comprising stop means interposed between the switch and the knob for selectively limiting rotation of the knob to any consecutive series of predetermined frequencies from one to n−1.

Other objects and advantages of the present invention will become apparent from the detailed description which follows.

DETAILED DESCRIPTION OF THE DRAWINGS

Figure 1:
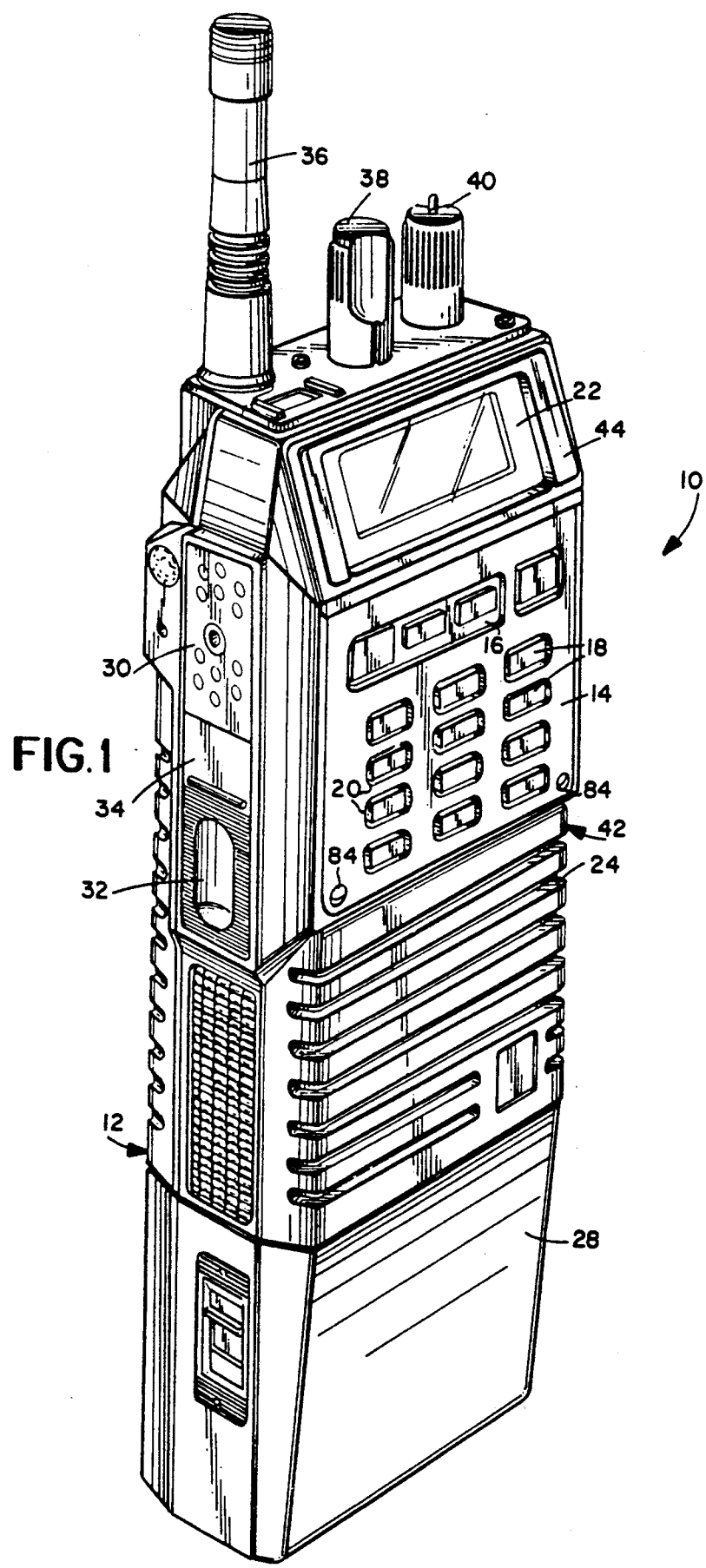
FIG. 1 is a perspective view of a transceiver unit which incorporates the features of the present invention.

With reference to FIG. 1, a multi frequency, radio transceiver unit 10 includes a metal housing 12 (which is preferably aluminum) which includes a front control panel 14 overlying a DTMF rubber key pad 16. The pad 16 has a number of individual keys 18 projecting through a corresponding plurality of apertures 20 in the control panel 14. An display 22 (preferably an LCD display) is mounted in an upper portion of the housing for viewing messages, channel names, status indicators, etc. A speaker grill 24 (which overlies a speaker and microphone, not shown) is incorporated into the housing 12, directly below the control panel 14. A battery pack 28 is operatively attached to the lower portion of the housing, and is easily connected/disconnected for replacement of batteries as needed.

Other features and/or components include a programmer connector 30, a transmit button 32, monitor button 34, antenna 36, volume control knob 38 and frequency selector knob 40.

This invention is particularly concerned with the manner in which different frequencies below a maximum frequency range capability can be quickly and easily set in accordance with transceiver model design criteria and/or requirements, after assembly of the unit has been otherwise completed.

Figure 2:
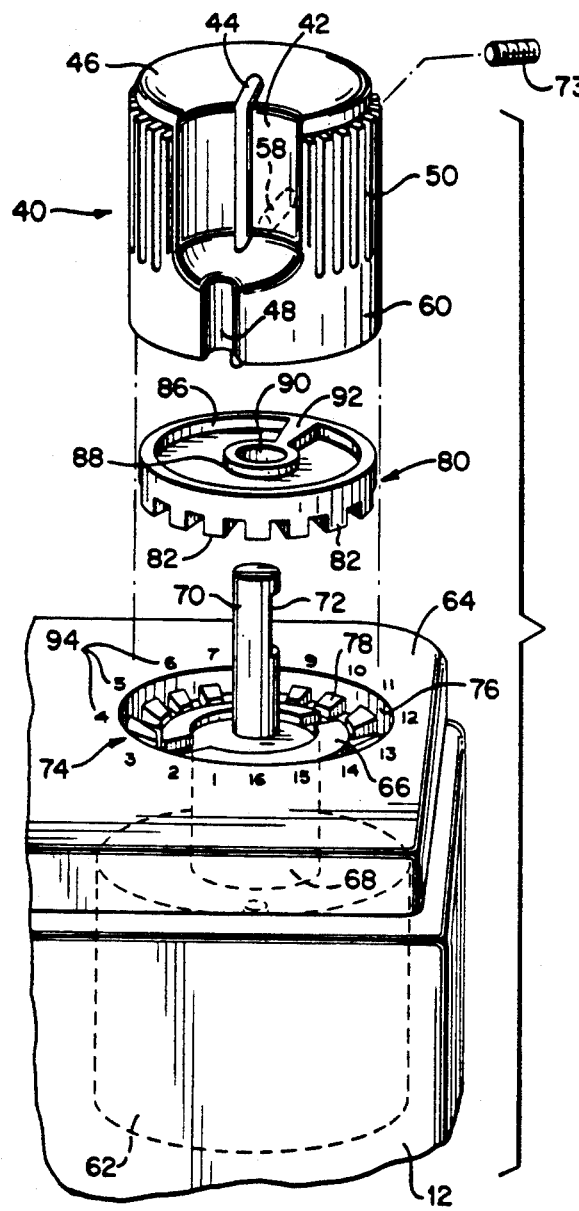
FIG. 2 is an exploded view of the frequency selector knob and stop device in accordance with the present invention.
Figure 3:
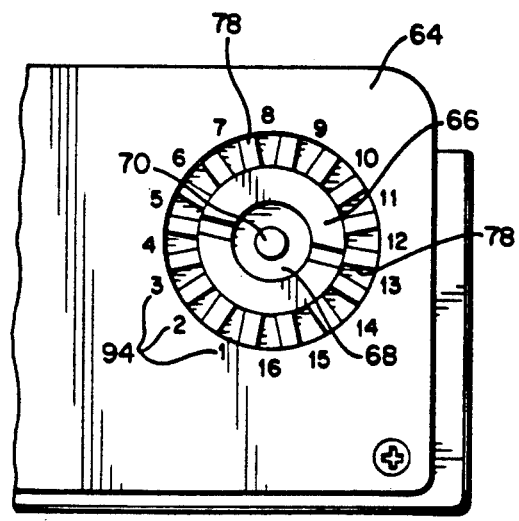
FIG. 3 is a partial plan view of the transceiver unit illustrated in FIGS. 1 and 2 with the frequency selector knob and stop device removed.

With reference to FIG. 2, the frequency selector knob 40 is generally cylindrical in shape, with the exception of a cut-out or recessed portion 42 which is formed with a centralized channel indicator 44 extending from the top wall 46 to the lower portion of the recess 42. A groove 48 is formed at the lower end of the knob in vertical alignment with the indicator 44. A knurled or ribbed surface 50 is provided at the upper end of the knob to facilitate turning.

Figure 6:
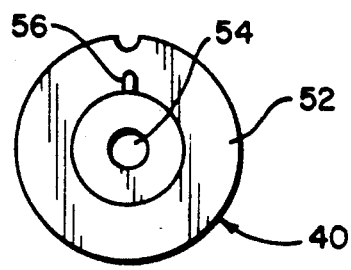
FIG. 6 is a bottom view of a frequency switch in accordance with the invention.

With reference to FIG. 6, the bottom surface 52 of the knob 40 is formed with a bore 54 for mounting the knob on the selector switch as described below, and a radially oriented stop element 56 which is aligned with groove 48 and indicator 44, and which projects downwardly from the bottom surface 52. A threaded bore 58 is formed within the knob 40, extending radially from the peripheral surface 60 to the bore 54 for receiving a set screw for a purpose also described below. The bore 54 is located 180° from, or diametrically opposite, the indicator 44, groove 48, and stop element 56.

Referring back to FIG. 2, a conventional channel frequency selector switch 62 is mounted within the housing 12, and specifically, within a top plate 64 of the housing. In this regard, a nut 66 secures the switch 62 in the top plate 64 by threadably engaging an upper portion 68 of the switch through an aperture (unnumbered) in the top plate 64. A switch shaft 70 extends upwardly from the top plate and is receivable within the bore 54 of knob 40. A flat 72 is provided on the shaft so that a set screw 73 can be tightened against the flat through the threaded bore 58 in order to securely fasten the knob 40 to the shaft 70.

The top plate 64 is formed with a circular recess 74 within which the nut 66 is seated, and from which the shaft 70 extends. The peripheral wall surface 76 of the recess 74 is formed with a plurality of radially inwardly directed, circumferentially spaced teeth 78 which are concentrically located relative to the nut 66 and shaft 70.

Figure 4:
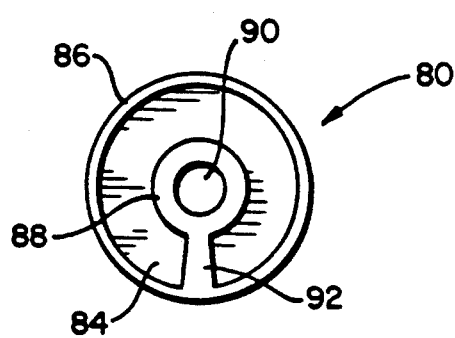
FIG. 4 is a plan view of a stop device in accordance with the invention.
Figure 5:
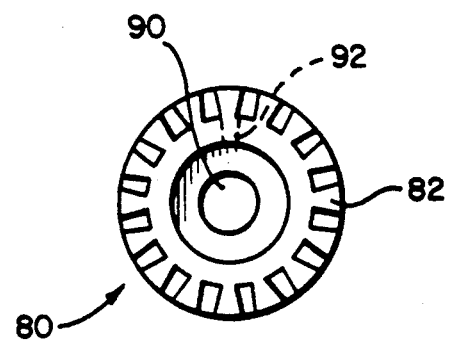
FIG. 5 is a bottom view of the stop device illustrated in FIG. 4.

With reference to FIGS. 2, 4 and 5, a stop plate or disc 80, preferably made of plastic, is formed on its lower surface with a plurality of radially inwardly directed teeth 82 which are adapted to mesh with the teeth 78 in recess 74. The upper portion of the disc or plate 80 is formed with a recess 84 defined by an outer peripheral wall 86 and an inner peripheral wall 88 surrounding a central bore 90. The latter permits the disc or plate to be slidably mounted on the shaft 70.

Within the recess 84, there is formed a radially arranged stop bar 92 extending radially from inner wall 88 to outer wall 86, thereby interrupting the continuity of the circular recess 74.

The function and operation of the stop plate or disc 80 will now be described. As already indicated, the selector switch is normally designed for sixteen channel use, as indicated by the indicia 94 on the top plate 64. With the shaft 70 located in its initial or start position, i.e., rotated counterclockwise to an internal limit, the knob 40 is mounted on the shaft and, with bore 58 aligned with flat 72, the set screw 73 is tightened. In this position, indicator 44 is aligned with the channel one indicia on the top plate 64 and the knob 40 is rotatable in stepwise fashion through the full sixteen channel range, until it reaches an internal stop corresponding to the channel sixteen indicia.

Figure 7:
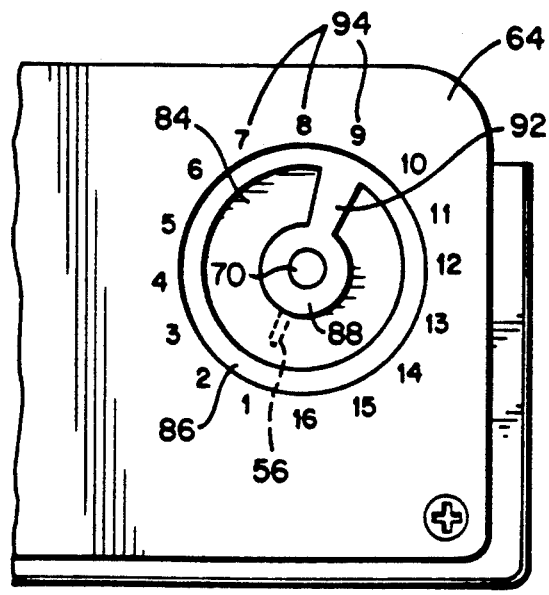
FIG. 7 is a partial plan view of the transceiver unit illustrated in FIGS. 1 and 3 with the stop device in place.

In the event the unit is to have a lesser frequency range, the set screw 73 is loosened and the knob 40 removed. With the shaft 70 again turned counterclockwise to its limit (corresponding to a knob setting at channel one), the disc 80 is slidably mounted on the shaft 70 and stop bar 92 is arranged to point to that channel which exceeds the desired channel by one. In other words, if a channel sequence of one through eight is desired, the disc is arranged so that stop bar 92 points to the channel nine indicia on the top plate 64, as shown in FIG. 7. Since the teeth 82 on disc 80 mesh with teeth 78 in the recess 74, the disc itself is fixed against rotation. Knob 40 is then replaced on the shaft 70, arranged so that bore 58 is adjacent flat 72, and indicator 44 points to channel one as shown in phantom in FIG. 7. Set screw 73 is then tightened. Now, knob 40 is rotatable in stepwise fashion, consecutively from channel one through channel eight. Since stop bar 92 occupies the channel nine position, it effectively prevents rotation of the knob beyond channel eight. This is due to engagement of the projecting stop element 56 with the stop bar 92, as the element 56 rotates through the recess portion 84.

In a similar manner, if only channels 1 through four are to be utilized, the disc 80 is located so that stop bar 92 is located at the channel five position, i.e., bar 92 points to channel five indicia as it appears on the top plate 64.

It will be appreciated that the disc 80 may be selectively arranged to limit rotation of the knob 40 to any selected series of consecutive channels from one to two through 15. The selector switch can also be held at the channel one position for single channel capability by setting the disc 80 so that the stop bar 92 is at the channel two position. At the other extreme, if all sixteen channels are to be utilized, the disc 80 is simply removed, and the selector switch 62 may be utilized in accordance with its originally intended use and capability. These modifications are achievable without having to disassemble the housing, and without having to modify the frequency selector switch construction.

It will be understood that the top plate 64, teeth 78, disc 80 and knob 40 (including stop element 56) are preferably of plastic construction, but suitable metals may also be employed. The invention is thus seen to provide a quick and simple adapter for altering the capability of a transceiver unit in accordance with particular transceiver model design capability.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a radio transceiver unit which is enclosed within a housing; a frequency switch mounted within a wall of said housing and a rotatable knob accessible from outside the housing for indexing the switch to a plurality of predetermined frequencies in a range from one to n, the knob having a frequency indicator thereon, and the housing having frequency indicating indicia thereon, the improvement comprising:

removable and adjustable stop means interposed between said switch and said knob and selectively engageable with means provided on an external surface of said wall of said housing for selectively limiting rotation of said knob to any consecutive series of said predetermined frequencies from one to n−1, thereby permitting external setting of a frequency capability of the unit.

2. The improvement according to claim 1 wherein said frequency switch includes a shaft, and said stop means comprises a disc mountable on said shaft, said disc having a plurality of first teeth formed on one side thereof, and said means provided on said wall of said housing includes a corresponding plurality of second teeth formed in a recess formed in said wall of said housing, said plurality of first teeth adapted to mesh with said plurality of second teeth.

3. The improvement according to claim 2 wherein said disc has a stop bar formed on its other side, and including a raised projection extending radially outwardly from the center of the disc.

4. The improvement according to claim 3 wherein said knob has a lower surface formed with a radial stop pin which is adapted to engage said raised projection during rotation of said knob to thereby limit rotation of said knob.

5. The improvement according to claim 4 wherein said switch shaft is provided with a flat surface for engagement with a set screw mounted for radial movement in said knob.

6. The improvement according to claim 5 wherein said frequency switch is provided with internal stop means for limiting rotation of said shaft in a counter-clockwise direction such that, when said shaft has reached its limit position, said frequency indicator is located at a first frequency position.

7. The improvement according to claim 6 wherein, when said frequency indicator is located at said first frequency position, and when said stop bar is aligned with a preselected frequency position between two and n minus one, then said stop bar will limit rotation of said knob to any consecutive series of frequencies from one through a frequency one less than that corresponding to said preselected frequency position.

8. The improvement according to claim 5 wherein said set screw is located 180° from said frequency indicator on said knob.

9. The improvement according to claim 1 wherein n=sixteen.

10. A radio transceiver unit comprising a housing;
a radio unit mounted within said housing;
a frequency switch mounted within said housing and including a shaft extending above a top plate of said housing. said frequency switch permitting said unit to operate at any of a predetermined number of frequencies;
a frequency selector knob rotatably and removably mounted on said shaft exteriorly of said housing for indexing said frequency switch to any one of said predetermined frequencies; and
adjustable stop means external of said frequency switch and cooperable with elements formed in an external surface of said top plate of said housing for limiting rotation of said knob to select any consecutive series of said frequencies from one up to and including a maximum available number less one, thereby permitting external setting of a frequency capability of the unit.

11. A radio transceiver unit according to claim 10 wherein said maximum available number is sixteen.

12. A radio transceiver unit according to claim 10 wherein said stop means comprises a disc mountable on said shaft between said frequency switch and said knob.

13. A radio transceiver unit according to claim 12 wherein said disc has upper and lower surfaces, said lower surface provided with a plurality of teeth extending about its periphery and engageable with said elements, wherein said elements comprise a corresponding number of teeth fixedly formed in said top plate of said housing adjacent said shaft.

14. A radio transceiver unit according to claim 13 wherein said upper surface of said disc is provided with an inner peripheral wall, an outer peripheral wall and a stop bar radially extending therebetween.

15. A radio transceiver unit according to claim 14 wherein said knob has a lower surface including a radial projection thereon engageable with said stop bar.

16. In a radio transceiver unit enclosed within a housing including a frequency selector switch and a frequency selector knob removably mounted on said switch exteriorly of said housing, wherein the switch has a maximum frequency selection capability, the improvement comprising an adjustable stop mechanism insertable between said knob and said switch within a recess formed in an exterior wall surface of said housing, said stop mechanism and said recess having respective pluralities of cooperable teeth for selectively limiting rotation of the frequency selector knob to a predetermined number of frequencies less than said maximum frequency selection capability of said switch, whereby, upon removal of said knob, a frequency capability may be set without opening said housing.

17. A radio transceiver unit according to claim 16 wherein said stop mechanism comprises a disc having a lower surface provided with one of said respective pluralities of cooperable teeth.

18. A radio transceiver unit according to claim 17 wherein said circular disc is locked against rotation when mounted on said shaft, and wherein said disc is formed with a stop bar engageable with a projection on said knob to limit rotation of said knob.

19. A radio transceiver unit according to claim 16 wherein said maximum frequency selection capability of said switch is sixteen.

20. A radio transceiver unit according to claim 17 wherein said upper surface of said disc is provided with an inner peripheral wall, an outer peripheral wall and a stop bar radially extending therebetween.

21. In a radio transceiver unit which is enclosed within a housing having a substantially flat plate, a frequency switch mounted within said flat plate and a rotatable and removable knob external of said housing for indexing the switch to a plurality of predetermined frequencies from one to n, the knob having a frequency indicator thereon, and the flat plate having frequency indicating indicia thereon, the improvement comprising:
adjustable stop means interposed between said switch and said knob and selectively engageable with first means provided on said flat plate of said housing and second means provided on an external surface of said knob for selectively limiting rotation of said knob to any consecutive series of said predetermined frequencies from one to n−1 to thereby permit external setting of a predetermined transceiver unit frequency capability.

22. The improvement according to claim 21 wherein the frequency switch includes a shaft extending outwardly from said housing and said knob is removably secured to said shaft, such that said stop means may be adjusted relative to said first means to thereby limit rotation of said knob to different ones of said consecutive series of predetermined frequencies without having to disassemble said housing and without having to remove said switch from said housing.

* * * * *